United States Patent
Li et al.

(10) Patent No.: US 11,326,091 B2
(45) Date of Patent: May 10, 2022

(54) WATER-BASED FRICTION REDUCING ADDITIVES

(71) Applicant: Multi-Chem Group, LLC, Houston, TX (US)

(72) Inventors: Leiming Li, Sugar Land, TX (US); Liang Xu, The Woodlands, TX (US); James William Ogle, Pittsburgh, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/830,530

(22) Filed: Mar. 26, 2020

(65) Prior Publication Data

US 2021/0301195 A1    Sep. 30, 2021

(51) Int. Cl.
*E21B 43/26* (2006.01)
*C09K 8/68* (2006.01)

(52) U.S. Cl.
CPC .............. *C09K 8/68* (2013.01); *E21B 43/26* (2013.01); *C09K 2208/28* (2013.01)

(58) Field of Classification Search
CPC ........ C09K 8/68; C09K 2208/28; E21B 43/26
See application file for complete search history.

(56) References Cited

U.S. PATENT DOCUMENTS

| | | | |
|---|---|---|---|
| 6,787,506 B2 | 9/2004 | Blair et al. | |
| 9,518,207 B2 * | 12/2016 | Ogle | C09K 8/035 |
| 9,982,184 B2 * | 5/2018 | Jones | C09K 8/68 |
| 10,040,988 B2 | 8/2018 | Yu et al. | |
| 2007/0135313 A1 | 6/2007 | King et al. | |
| 2009/0163387 A1 * | 6/2009 | Sullivan | C09K 8/88 507/202 |
| 2012/0125617 A1 * | 5/2012 | Gu | E21B 43/26 166/308.1 |
| 2012/0245061 A1 * | 9/2012 | Kakadjian | C09K 8/62 507/225 |
| 2013/0112419 A1 | 5/2013 | DeFosse et al. | |
| 2015/0203742 A1 * | 7/2015 | Reddy | C09K 8/035 507/225 |
| 2017/0096597 A1 | 4/2017 | Hu et al. | |
| 2018/0148635 A1 | 5/2018 | Shen et al. | |
| 2019/0112521 A1 | 4/2019 | McDaniel et al. | |

FOREIGN PATENT DOCUMENTS

EP    2151486 A1    10/2010

OTHER PUBLICATIONS

International Search Report and Written Opinion issued in related PCT Application No. PCT/US2020/025711 dated Sep. 15, 2020, 12 pages.

* cited by examiner

*Primary Examiner* — Silvana C Runyan
(74) *Attorney, Agent, or Firm* — Tenley Krueger; Baker Botts L.L.P.

(57) ABSTRACT

Methods and compositions for treating aqueous fluids that may be included in treatment fluids that are used for treating a subterranean formation. In some embodiments, the methods include: providing a water-based friction reducing additive that includes an aqueous base fluid, a salt, a first friction reducing polymer, and a suspension agent; introducing the water-based friction reducing additive into a treatment fluid; and introducing the treatment fluid into a wellbore penetrating at least a portion of a subterranean formation at a pressure sufficient to create or enhance one or more fractures within the subterranean formation.

13 Claims, 6 Drawing Sheets

WATER-BASED FRICTION REDUCING ADDITIVES

BACKGROUND

The present disclosure relates to methods and compositions for treating subterranean formations.

Treatment fluids may be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid.

One production stimulation operation that employs a treatment fluid is hydraulic fracturing. Hydraulic fracturing operations generally involve pumping a treatment fluid (e.g., a fracturing fluid) into a wellbore that penetrates a subterranean formation at a sufficient hydraulic pressure to create or enhance one or more cracks, or "fractures," in the subterranean formation. The fracturing fluid may include particulates, often referred to as "proppant" particulates, that are deposited in the fractures. The proppant particulates function, inter alia, to prevent the fractures from fully closing upon the release of hydraulic pressure, forming conductive channels through which fluids and hydrocarbons may flow to the wellbore.

In certain approaches, hydraulic fracturing may use a cross-linked polymer to increase the viscosity of the fracturing fluid. The relatively high viscosity of such a fluid may, among other benefits, help transport the proppant particulates to the desired location within the formation and/or allow the fracturing fluid to be loaded with a higher concentration of proppant particulates. Once at least one fracture is created and the proppant particulates are substantially in place, the viscosity of the fracturing fluid usually is reduced, and the fracturing fluid may be recovered from the formation. The treatment fluid that is recovered is known as a flowback fluid.

An alternative type of hydraulic fracturing, known as slickwater hydraulic fracturing, does not use a cross-linked polymer. The fracturing fluid has a relatively low viscosity as a result. Slickwater fracturing may be used to generate narrow, complex fractures with low concentrations of proppants. Because the viscosity of the fracturing fluid is relatively low, the proppant transport is achieved by increasing the pumping rate and pressure of the fracturing fluid. During pumping, significant energy loss can occur due to the friction between the fracturing fluid and the casing or tubing, particularly when the fracturing fluid is in turbulent flow.

A friction reducing polymer is often introduced to the treatment fluid during slickwater fracturing operations to minimize such energy consumption. The friction reducing polymer is typically an uncross-linked polymer because cross-linking often reduces the ability of the polymer to suppress friction during pumping operations, and in fact, often results in increased friction. The friction reducing polymer facilitates laminar flow of the treatment fluid, which causes less frictional forces and energy loss than turbulent flow of the same fluid.

BRIEF DESCRIPTION OF THE DRAWINGS

These drawings illustrate certain aspects of some of the embodiments of the present disclosure and should not be used to limit or define the claims.

Figure 1:
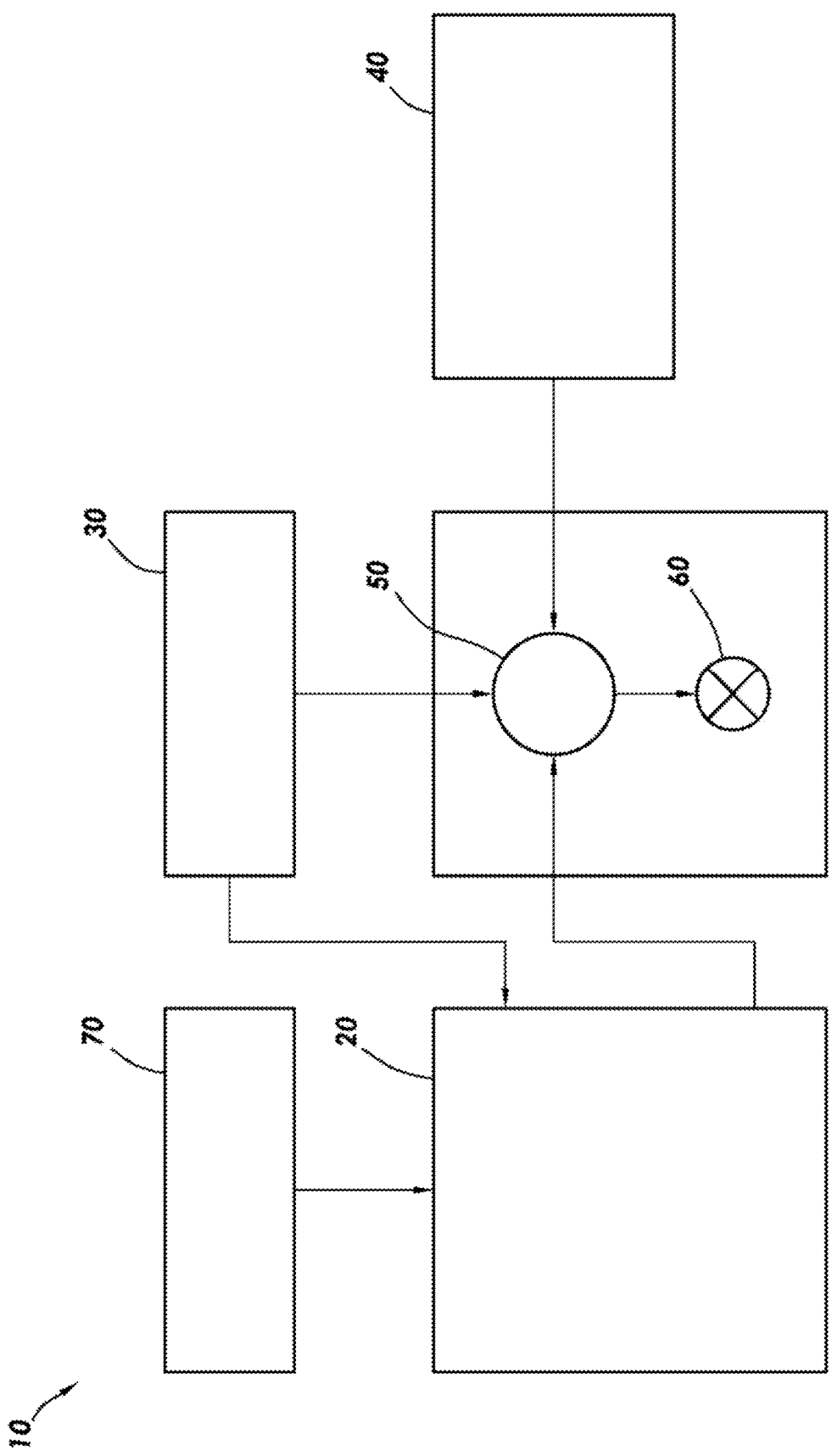
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only and are not exhaustive of the scope of the disclosure.

DESCRIPTION OF CERTAIN EMBODIMENTS

The present disclosure relates to compositions and methods for treating a subterranean formation. More particularly, the present disclosure relates to compositions and methods for treating aqueous fluids that are used for treating a subterranean formation.

The present disclosure provides compositions including a water-based friction reducing additive that includes an aqueous base fluid, a salt, a first friction reducing polymer, and a suspension agent. The present disclosure also provides methods that include adding the water-based friction reducing additive to an aqueous fluid to form a treatment fluid. In some embodiments, the methods may further include adding one or more additives to a treatment fluid. In some embodiments, the methods may further include adding one or more additives to the treatment fluid to form a slickwater hydraulic fracturing fluid.

Among the many potential advantages to the methods and compositions of the present disclosure, only some of which are alluded to herein, the methods and compositions of the present disclosure may provide for friction reduction of a treatment fluid. For example, in some embodiments, the methods and compositions of the present disclosure may reduce the friction generated as the treatment fluid is pumped down the subterranean formation. Accordingly, the methods and compositions of the present disclosure may reduce energy loss that results from the friction between the treatment fluid and the wellbore casing or tubing. Moreover, the methods and compositions of the present disclosure may provide a water-based friction reducing additive that will readily and quickly mix with aqueous fluids (e.g., fracturing fluid makeup water), particularly as compared with certain conventional friction reducing systems and additives (e.g., oil-based friction reducing additives). Furthermore, the methods and compositions of the present disclosure may provide a water-based friction reducing additive that will enhance the suspension stability of the water-based friction reducing additive, particularly as compared with certain conventional water-based friction reducing additives that may exhibit syneresis.

In certain embodiments, the water-based friction reducing additives of the present disclosure may include an aqueous base fluid, a salt, a first friction reducing polymer, and a suspension agent. The term "friction reducing polymer," as used herein, refers to a polymer that reduces frictional losses due to friction between an aqueous fluid in turbulent flow and tubular goods (e.g. pipes, coiled tubing, etc.) and/or the formation.

In some embodiments, the suspension agent may include a second friction reducing polymer. In certain embodiments, the suspension agent may include a nano-structured and/or micro-structured hydrophilic clay. In other embodiments, the composition of the water-based friction reducing additive may further include a surfactant.

The fluids used in the methods and compositions of the present disclosure may include any aqueous base fluid known in the art and any combinations thereof. The term "base fluid" refers to the major component of the fluid (as opposed to components dissolved and/or suspended therein), and does not indicate any particular condition or property of that fluid such as its mass, amount, pH, etc. The aqueous base fluid used in the water-based friction reducing additive of the present disclosure may include water from any source, which may include fresh water, saltwater (e.g., water containing one or more salts dissolved therein), brine (e.g., saturated saltwater), seawater, produced water, surface water (e.g., from a river or a pond), reclaimed water, or any combination thereof.

In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of polymers, nanoparticles, and/or other additives included in the fluid. One of ordinary skill in the art, with the benefit of this disclosure, will recognize when such density and/or pH adjustments are appropriate. In certain embodiments, the treatment fluids may include a mixture of one or more base fluids and/or gases, including but not limited to emulsions, foams, and the like.

In some embodiments, the additives of the present disclosure may include one or more salts. Examples of salts suitable for certain embodiments of the present disclosure include, but are not limited to, ammonium sulfate, ammonium chloride, potassium chloride, sodium sulfate, magnesium sulfate, aluminum sulfate, sodium bromide, potassium bromide, calcium chloride, calcium bromide, zinc bromide, sodium chloride, magnesium chloride, strontium chloride, barium chloride, sodium bicarbonate, a carbonate salt, a sulfate salt, a phosphate salt, a magnesium salt, a bromide salt, a formate salt, an acetate salt, a chloride salt, a fluoride salt, a bicarbonate salt, a nitrate salt, a phosphate salt, and any combination thereof. In some embodiments, the salt may be present in the additive of the present disclosure in an amount sufficient to inhibit the hydration of one or more friction reducing polymers. In certain embodiments, the salt may be present in the water-based friction reducing additive in an amount from about 1 to about 60 weight percent ("wt %") by weight of the additive. In some embodiments, the salt may be present in an amount from about 1 wt % to about 30 wt % by weight of the additive. In other embodiments, the salt may be present in an amount from about 10 wt % to about 45 wt % by weight of the additive.

The first friction reducing polymer may include one or more nonionic, anionic, cationic, and/or amphoteric polymers. As used herein, unless the context otherwise requires, a "polymer" or "polymeric material" includes homopolymers, copolymers, terpolymers, etc. In addition, the term "copolymer," as used herein, is not limited to the combination of polymers having two monomeric units, but includes any combination of monomeric units, for example, terpolymers, tetrapolymers, etc. In certain embodiments, the first friction reducing polymer may include high molecular weight, linear polymers. Examples of polymers that may be suitable for certain embodiments of the present disclosure include, but are not limited to, polyacrylates, polyacrylate derivatives, polyacrylate copolymers, polymethacrylates, polymethacrylate derivatives, polymethacrylate copolymers, polyacrylamide, polyacrylamide derivatives, polyacrylamide copolymers, acrylamide copolymers, polysaccharides, polysaccharide derivatives, polysaccharide copolymers, synthetic polymers, superabsorbent polymers, and any combination thereof. In certain embodiments, the first friction reducing polymer may include one or more water-soluble polymers. In certain embodiments, the water-soluble polymers may include one or more of the following monomers: 2-acrylamido-2-methylpropane sulfonic acid (AMPS), acrylamido tertiary butyl sulfonic acid (ATBS), 2-(meth)acrylamido-2-methylpropane sulfonic acid, 2-amino-2-methyl-1-propanol (AMP), N,N-dimethylacrylamide (DMF), vinyl sulfonic acid, N-vinyl acetamide, N-vinyl formamide, itaconic acid, methacrylic acid, acrylic acid ester, methacrylic acid ester, acrylic acid, vinyl acetate, ethoxylated-2-hydroxyethyl acrylate, ethoxylated-2-hydroxyethyl methacrylate, 2-hydroxyethyl acrylate, 2-hydroxyethylmethyl methacrylate, 2-hydroxypropyl acrylate, 2-hydroxypropyl methacrylate, hydroxymethyl styrene, a salt of any of the foregoing, and any combination thereof. In certain embodiments, the first friction reducing polymer is a copolymer including polyacrylamide and 2-acrylamido-2-methylpropane sulfonic acid.

In certain embodiments, the water-based friction reducing additive may include a first friction reducing polymer with a molecular weight sufficient to provide a desired level of friction reduction. In some embodiments, polymers having higher molecular weights may be needed to provide a desirable level of friction reduction. In certain embodiments, the first friction reducing polymer has a molecular weight in the range of about 5,000 Daltons ("Da") to about 999,000,000 Da. In other embodiments, the first friction reducing polymer has a molecular weight in the range of about 1,000,000 Da to about 50,000,000 Da. In other embodiments, the first friction reducing polymer has a molecular weight in the range of about 3,000,000 Da to about 30,000,000 Da.

In some embodiments, the first friction reducing polymer may be present in the additive of the present disclosure in an amount sufficient to provide a desirable level of friction reduction. In certain embodiments, the first friction reducing polymer may be present in the water-based friction reducing additive in an amount from about 10 wt % to about 70 wt % by weight of the additive. In some embodiments, the first friction reducing polymer may be present in an amount from about 10 wt % to about 50 wt % by weight of the additive. In certain embodiments, the first friction reducing polymer may be present in an amount from about 15 wt % to about 40 wt % by weight of the additive.

In certain embodiments, the suspension agent may increase the suspension stability of the water-based friction reducing additive. For example, the suspension agent may enhance the ability of the suspension to remain in a suspended state and/or resist change in the dispersed state of the fluid. In certain embodiments, the suspension agent may reduce syneresis in the water-based friction reducing additive. In some embodiments, the suspension agent may increase the shelf life of the water-based friction reducing additive. In some embodiments, the suspension agent may enhance the solubility of the water-based friction reducing additive. In some embodiments, the suspension agent may enhance the elasticity of the water-based friction reducing additive. In other embodiments, the suspension agent may enhance the friction reducing capability of the water-based friction reducing additive.

In certain embodiments, the suspension agent may include a second friction reducing polymer. The second friction reducing polymer may include one or more non-ionic, anionic, cationic, and/or amphoteric polymers. In some embodiments, the second friction reducing polymer may include a polymeric chain without side chains. In certain embodiments, the second friction reducing polymer may include high molecular weight, linear polymers.

Examples of polymers that may be suitable for certain embodiments of the second friction reducing polymers of the present disclosure include, but are not limited to, polyacrylates, polyacrylate derivatives, polyacrylate copolymers, polymethacrylates, polymethacrylate derivatives, polymethacrylate copolymers, polyacrylamide, polyacrylamide derivatives, polyacrylamide copolymers, acrylamide copolymers, polysaccharides, polysaccharide derivatives, polysaccharide copolymers, synthetic polymers, superabsorbent polymers, and any combination thereof. In certain embodiments, the second friction reducing polymer may be the same polymer as the first friction reducing polymer. In some embodiments, the second friction reducing polymer may be a different polymer than the first friction reducing polymer. In other embodiments, the first friction reducing polymer and the second friction reducing polymer may belong to a category of a polyacrylamide, a partially hydrolyzed polyacrylamide, an acrylamide copolymer, and any combination thereof.

In certain embodiments, the second friction reducing polymer may have a molecular weight sufficient to stabilize the suspension of the first friction reducing polymer in the water-based friction reducing additive. In certain embodiments, the second friction reducing polymer has a molecular weight in the range of about 5,000 Daltons ("Da") to about 999,000,000 Da. In some embodiments, the second friction reducing polymer has a molecular weight in the range of about 1,000,000 Da to about 50,000,000 Da. In other embodiments, the second friction reducing polymer has a molecular weight in the range of about 3,000,000 Da to about 30,000,000 Da.

In certain embodiments, the second friction reducing polymer may be present in the additive of the present disclosure in an amount sufficient to stabilize the suspension of the first friction reducing polymer in the water-based friction reducing additive. In certain embodiments, the second friction reducing polymer may be present in the water-based friction reducing additive in an amount from about 0.01 wt % to about 10 wt % by weight of the additive. In some embodiments, the second friction reducing polymer may be present in an amount from about 0.1 wt % to about 3 wt % by weight of the additive. In other embodiments, the second friction reducing polymer may be present in an amount from about 0.2 wt % to about 2 wt % by weight of the additive.

In certain embodiments, the suspension agent may include a clay. In certain embodiments, the clay may include a hydrophilic clay. In certain embodiments, the suspension agent may include a second friction reducing polymer and a clay. Examples of clays that may be suitable for certain embodiments of the present disclosure include, but are not limited to, a bentonite clay, a phyllosilicate clay, and any combination thereof. In some embodiments, the clay may include BYK OPTIBENT-987, a clay commercially available from BYK Additives and Instruments of Gonzales, Tex. In certain embodiments, the clay may include nano-structures and/or micro-structures. In certain embodiments, the clay may be present in the water-based friction reducing additive in an amount from about 0.1 wt % to about 30 wt % by weight of the additive. In some embodiments, the clay may be present in an amount from about 1 wt % to about 15 wt % by weight of the additive. In other embodiments, the clay may be present in an amount from about 1 wt % to about 10 wt % by weight of the additive.

In some embodiments, the water-based friction reducing additive of the present disclosure optionally may include at least one surfactant, which may act as a compatibility agent and/or dispersion aid, e.g., to facilitate mixing and to enhance polymer hydration. The surfactants may include any known surfactant, and may be cationic, anionic, nonionic, or amphoteric. Types of cationic surfactants that may be suitable for certain embodiments include, but are not limited to, alkyl amines, alkyl amine salts, quaternary ammonium salts such as polydiallyldimethyl ammonium chloride (polyDADMAC), didecyldimethylammonium chloride (DDAC), alkyl dimethyl benzyl ammonium chloride (ADBAC), and trimethyltallowammonium chloride, amine oxides, alkyltrimethyl amines, triethyl amines, alkyldimethylbenzylamines, alkylamidobetaines such as cocoamidopropyl betaine, alpha-olefin sulfonate, C8 to C22 alkylethoxylate sulfate, trimethylcocoammonium chloride, derivatives thereof, and combinations thereof. Types of anionic surfactants that may be suitable for certain embodiments of the present disclosure include, but are not limited to, alkyl carboxylates, alkylether carboxylates, N-acylaminoacids, N-acylglutamates, N-acylpolypeptides, alkylbenzenesulfonates, paraffinic sulfonates, α-olefinsulfonates, lignosulfates, sulfosuccinate derivatives, polynapthylmethylsulfonates, alkyl sulfates, alkylethersulfates, monoalkylphosphates, polyalkylphosphates, fatty acids, alkali salts of acids, alkali salts of fatty acids, alkaline salts of acids, sodium salts of acids, sodium salts of fatty acid, alkyl ethoxylate, soaps, derivatives thereof, and combinations thereof. Types of nonionic surfactants that may be suitable for certain embodiments of the present disclosure include, but are not limited to, alcohol oxylalkylates, alkyl phenol oxylalkylates, nonionic esters such as sorbitan esters alkoxylates of sorbitan esters, castor oil alkoxylates, fatty acid alkoxylates, lauryl alcohol alkoxylates, nonylphenol alkoxylates, octylphenol alkoxylates, and tridecyl alcohol alkoxylates. The selection of a suitable surfactant may depend on several factors that would be recognized by a person of skill in the art with the benefit of this disclosure, including but not limited to the type of polymers in the water-based friction reducing additive, the characteristics of the aqueous fluid (e.g., pH, salinity, etc.), and the like.

In some embodiments, certain surfactants may exhibit certain synergistic effects with the friction reducing polymer(s) in the water-based friction reducing additive, which may enhance the degree to which the friction reducing polymer(s) are able to reduce friction, improve suspension stability, and/or increase viscosity. In certain embodiments, one or more surfactants may enhance the viscosity of the treatment fluid. In some embodiments, the surfactant may be mixed with the other components of the water-based friction reducing additive before it is mixed into the treatment fluid. In some embodiments, the surfactant may be added to the treatment fluid separately from (before, after, or concurrently with) the components of the water-based friction reducing additive. In other embodiments, the aqueous components of the present disclosure may be substantially or entirely free of surfactants.

In certain embodiments, one or more surfactants may be present in the water-based friction reducing additive in an amount from about 0.01 wt % to about 10 wt % by weight of the additive. In some embodiments, one or more surfactants may be present in an amount from about 0.02 wt % to about 5 wt % by weight of the additive. In other embodiments, one or more surfactant may be present in an amount from about 0.03 wt % to about 3 wt % by weight of the additive.

In certain embodiments, the methods of the present disclosure may include adding the composition of the water-based friction reducing additive to a treatment fluid, or to an aqueous fluid to form a treatment fluid. In certain embodiments, the water-based friction reducing additive is present in the treatment fluid in an amount sufficient to maintain laminar flow when the treatment fluid is pumped into the wellbore and/or subterranean formation. For example, in some embodiments, the water-based friction reducing additive may be present in the treatment fluid in an amount from about 0.1 to about 100 gallons per thousand gallons of fluid ("gpt"). In some embodiments, the additive may be present in the treatment fluid in an amount from about 0.1 gpt to about 5 gpt, or in other embodiments, from about 0.25 gpt to about 2 gpt. In some embodiments, the additive may be present in the treatment fluid in an amount less than about 3 gpt, or alternatively, less than about 2 gpt. In certain embodiments, an amount of the additive on the higher end of the above ranges may be desired, among other reasons, to impart adequate viscosity to the treatment fluid. In certain embodiments, the additive of the present disclosure may have a total concentration less than 3 gpt, or alternatively, less than about 2 gpt.

In certain embodiments, the components of the present disclosure including the aqueous base fluid, the salt, the first friction reducing polymer, and the suspension agent may be combined together before being added to the treatment fluid. In such embodiments, compositions including one or more of those components may be stored (e.g., in a tank or vessel) for a period of time before being added to the treatment fluid. In certain embodiments, such compositions may be stored for up to 12 months before being added to the treatment fluid. In certain embodiments, such compositions may increase the suspension stability of the present disclosure. For example, such compositions may enhance the ability of the present disclosure to remain in a suspended state and/or resist change in the dispersed state of the fluid. In certain embodiments, such compositions may be stable for up to 12 months before being added to the treatment fluid. In some embodiments, such compositions may be stable for up to 6 months before being added to the treatment fluid. In other embodiments, such compositions may be stable for at least 2 weeks before being added to the treatment fluid. In other embodiments, such compositions may be stable for at least 4 weeks before being added to the treatment fluid. In other embodiments, such compositions may be stable for at least 2 months before being added to the treatment fluid.

In other embodiments, the aqueous base fluid, the salt, the first friction reducing polymer, and the suspension agent may be added separately to the treatment fluid. In such embodiments, the aqueous base fluid, the salt, the first friction reducing polymer, and the suspension agent may collectively constitute a composition even when separately added to the treatment fluid. In certain embodiments, the compositions of the present disclosure (or one or more components thereof) may be directly metered into the treatment fluid. In certain embodiments, the composition (or one or more components thereof) may be added to the treatment fluid by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the ongoing treatment. Such mixing can also be described as "real-time" mixing. In other embodiments, the composition (or one or more components thereof) may be pulsed into the treatment fluid. In certain embodiments, the composition (or one or more components thereof) may be injected into a pipeline upstream of a tank or other suitable vessel containing the treatment fluid. In other embodiments, the composition (or one or more components thereof) may be directly added to the tank or other suitable vessel containing the treatment fluid.

In certain embodiments, the methods of the present disclosure may include adding one or more additives to the treatment fluid including a composition of the present disclosure. In certain embodiments, the one or more additives may be added to the treatment fluid after the composition has been added to the treatment fluid. Examples of such additional additives include, but are not limited to, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, antifoam agents, bridging agents, flocculants, $H_2S$ scavengers, $CO_2$ scavengers, oxygen scavengers, lubricants, viscosifiers, breakers, weighting agents, relative permeability modifiers, resins, surfactants, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

In certain embodiments, the treatment fluid of the present disclose may include one or more proppant particulates. Examples of materials that may be suitable for use as proppant particulates in certain embodiments of the present disclosure include, but are not limited to, fly ash, silica, alumina, fumed carbon (e.g., pyrogenic carbon), carbon black, graphite, mica, titanium dioxide, metal-silicate, silicate, kaolin, talc, zirconia, boron, hollow microspheres (e.g., spherical shell-type materials having an interior cavity), glass, sand, bauxite, sintered bauxite, ceramic, calcined clays (e.g., clays that have been heated to drive out volatile materials), partially calcined clays (e.g., clays that have been heated to partially drive out volatile materials), composite polymers (e.g., thermoset nanocomposites), halloysite clay nanotubes, and any combination thereof. The proppant particulates may be of any shape (regular or irregular) suitable or desired for a particular application. In some embodiments, the proppant particulates may be round or spherical in shape, although they may also take on other shapes such as ovals, capsules, rods, toroids, cylinders, cubes, or variations thereof. In certain embodiments, the proppant particulates of the present disclosure may be relatively flexible or deformable, which may allow them to enter certain perforations, microfractures, or other spaces within a subterranean formation whereas solid particulates of a similar diameter or size may be unable to do so.

In certain embodiments, the treatment fluid may include proppant particulates in an amount from about 0.05 to about 12 pounds of particulates per gallon of treatment fluid ("ppg"). In other embodiments, the treatment fluid may include the proppant particulates in an amount from about 3 ppg to about 10 ppg. In other embodiments, the treatment fluid may include the proppant particulates in an amount from about 0.1 ppg to about 0.5 ppg, in other embodiments, about 0.5 ppg to about 1.0 ppg, in other embodiments, about 1.0 ppg to about 2.0 ppg, in other embodiments, about 2.0 ppg to about 3.0 ppg, in other embodiments, about 3.0 ppg to about 4.0 ppg, in other embodiments, about 4.0 ppg to about 5.0 ppg, in other embodiments, about 5.0 ppg to about 6.0 ppg, in other embodiments, about 6.0 ppg to about 7.0 ppg, in other embodiments, about 7.0 ppg to about 8.0 ppg, in other embodiments, about 8.0 ppg to about 9.0 ppg, and in other embodiments, about 9.0 ppg to about 10 ppg.

The treatment fluid of the present disclosure may be introduced into a portion of a subterranean formation. The treatment fluid may be, for example, a stimulation fluid or a hydraulic fracturing fluid. In introducing a treatment fluid of the present disclosure into a portion of a subterranean formation, the components of the treatment fluid may be mixed together at the surface (or offsite prior to transport to the wellsite) and introduced into the formation together, or one or more components may be separately introduced into the formation at the surface from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluid to carry out hydraulic fracturing treatments (including fracture acidizing treatments). In certain embodiments, a treatment fluid may be introduced into a subterranean formation. In some embodiments, the treatment fluid may be introduced into a wellbore that penetrates a subterranean formation. In some embodiments, the treatment fluid may be introduced at or above a pressure sufficient to create or enhance one or more fractures within the subterranean formation. In some embodiments, the treatment fluid may be introduced using one or more pumps. The treatment fluid used in these fracturing treatments may include a number of different types of fluids, including but not limited to pre-pad fluids, pad fluids, fracturing fluids, slickwater fluids, proppant-laden fluids, and the like. In some embodiments, the treatment fluid of the present disclosure may have a viscosity from about 50 cP or less, or alternatively, about 25 cP or less, or alternatively, about 15 cP or less. In some embodiments, the treatment fluid of the present disclosure may have a viscosity from about 4 cP to about 15 cP at a shear rate of 511 s$^{-1}$. In other embodiments, the treatment fluid of the present disclosure may have higher viscosities, e.g., up to about 1000 cP.

In certain embodiments, the viscosity of the treatment fluid of the present disclosure may be significantly reduced (e.g., to about 1.5 cP or less) after a certain period of time, among other reasons, to facilitate pumping and/or flowback of the fluids after use. In some embodiments, the viscosity of the treatment fluid may be reduced by the addition or activation of a breaker additive (e.g., an acid or other chemical agent that may degrade the polymer), or when subjected to certain amounts of shear, heat, or other conditions. In some embodiments, the viscosity of the treatment fluid may decrease after the passage of sufficient time (e.g., within 24 hours, within 4 hours at temperatures of 140° F., or within about 0.5 hours at temperatures of 140° F.) without the addition of any breaker additives thereto or change of conditions.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, an optional proppant source 40, and a pump and blender system 50 and resides at the surface at a wellsite where a well 60 is located. In certain instances, the fracturing fluid producing apparatus 20 combines a gel precursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid can be directly sourced from the fluid source 30. In certain instances, the fracturing fluid may include water, a hydrocarbon fluid, a polymer gel, foam, air, wet gases and/or other fluids.

The proppant source 40 can include a proppant for combination with the fracturing fluid. The system may also include one or more additive sources 70 that provides one or more additives (e.g., the compositions of the present disclosure, as well as other optional additives) to alter the properties of the fracturing fluid. For example, the other additives 70 can be included to reduce pumping friction, to reduce or eliminate the fluid reaction to the geological formation in which the well is formed, to operate as surfactants, and/or to serve other functions.

The pump and blender system 50 receives the fracturing fluid and combines it with other components, including optional proppant from the proppant source 40 and/or additional fluid from the additives 70. The resulting mixture may be pumped down the well 60 at or above a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some, or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
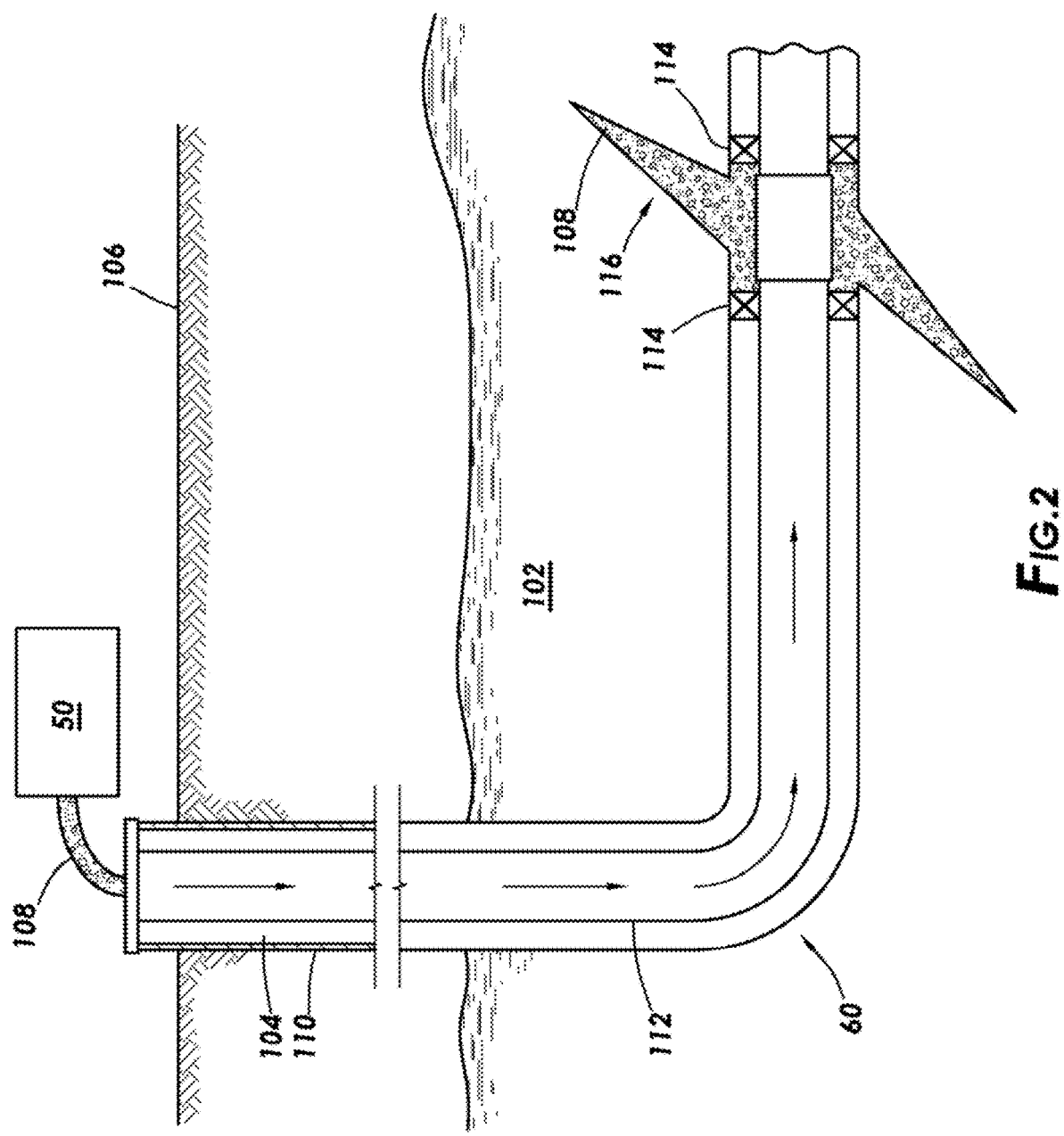
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the wellbore 104. The pump and blender system 50 is coupled with a work string 112 to pump the fracturing fluid 108 into the wellbore 104. The working string 112 may include coiled tubing, jointed pipe, and/or other structures that allow fluid to flow into the wellbore 104. The working string 112 can include flow control devices, bypass valves, ports, and/or other tools or well devices that control a flow of fluid from the interior of the working string 112 into the subterranean zone 102. For example, the working string 112 may include ports adjacent the wellbore wall to directly communicate the fracturing fluid 108 into the subterranean formation 102, and/or the working string 112 may include ports that are spaced apart from the wellbore wall to communicate the fracturing fluid 108 into an annulus in the wellbore between the working string 112 and the wellbore wall.

The working string 112 and/or the wellbore 104 may include one or more sets of packers 114 that seal the annulus between the working string 112 and wellbore 104 to isolate an interval of the wellbore 104 into which the fracturing fluid 108 will be pumped. FIG. 2 shows two packers 114, one defining an uphole boundary of the interval and one defining the downhole end of the interval. When the fracturing fluid 108 is introduced into wellbore 104 (e.g., in FIG. 2, the area of the wellbore 104 between packers 114) at a sufficient hydraulic pressure, one or more fractures 116 may be created in the subterranean zone 102. Optionally, the proppant particulates in the fracturing fluid 108 may enter the fractures 116 where they may remain after the fracturing fluid flows out of the wellbore. These proppant particulates may "prop" fractures 116 such that fluids may flow more freely through the fractures 116. In some embodiments, multiple intervals in the same wellbore/formation may be successively isolated and treated in a similar manner.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method that includes: providing a water-based friction reducing additive that includes an aqueous base fluid, a salt, a first friction reducing polymer, and a suspension agent; introducing the water-based friction reducing additive into a treatment fluid; and introducing the treatment fluid into a wellbore penetrating at least a portion of a subterranean formation at a pressure sufficient to create or enhance one or more fractures within the subterranean formation.

In one or more embodiments described in the preceding paragraph, the suspension agent includes a second friction reducing polymer or a clay. In one or more embodiments described in the preceding paragraph, the suspension agent is present in the water-based friction reducing additive in an amount from about 0.01 wt % to about 30 wt % by weight of the water-based friction reducing additive. In one or more embodiments described in the preceding paragraph, the first friction reducing polymer includes at least one polymer selected from the group consisting of an acrylamide copolymer, an anionic acrylamide copolymer, a cationic acrylamide copolymer, a nonionic acrylamide copolymer, an amphoteric acrylamide copolymer, a polyacrylamide, a polyacrylamide derivative, a polyacrylate, a polyacrylate derivative, a polymethacrylate, a polymethacrylate derivative, and any combination thereof. In one or more embodiments described in the preceding paragraph, the first friction reducing polymer includes at least one monomer selected from the group consisting of a 2-acrylamido-2-methylpropane sulfonic acid, an acrylamido tertiary butyl sulfonic acid, an acrylic acid, a salt of any of the foregoing, and any combination thereof. In one or more embodiments described in the preceding paragraph, the first friction reducing polymer includes at least one polymer selected from the group consisting of a nonionic polymer, an anionic polymer, a cationic polymer, an amphoteric polymer, and any combination thereof. In one or more embodiments described in the preceding paragraph, the first friction reducing polymer is present in the water-based friction reducing additive in an amount from about 10 wt % to about 70 wt % by weight of the water-based friction reducing additive. In one or more embodiments described in the preceding paragraph, the water-based friction reducing additive is present in the treatment fluid in an amount from about 0.1 gpt to about 100 gpt by volume of the treatment fluid. In one or more embodiments described in the preceding paragraph, the salt includes at least one salt selected from the group consisting of a carbonate salt, a sulfate salt, a phosphate salt, a magnesium salt, a bromide salt, a formate salt, an acetate salt, a chloride salt, a fluoride salt, a bicarbonate salt, a nitrate salt, a phosphate salt, and any combination thereof.

An embodiment of the present disclosure is a composition that includes: an aqueous base fluid, a salt, a first friction reducing polymer present in the composition in an amount from about 10 wt % to about 70 wt % by weight of the composition, and a suspension agent.

In one or more embodiments described in the preceding paragraph, the composition further includes a surfactant. In one or more embodiments described in the preceding paragraph, the suspension agent includes a second friction reducing polymer or a clay. In one or more embodiments described in the preceding paragraph, the first friction reducing polymer includes at least one polymer selected from the group consisting of an acrylamide copolymer, an anionic acrylamide copolymer, a cationic acrylamide copolymer, a nonionic acrylamide copolymer, an amphoteric acrylamide copolymer, a polyacrylamide, a polyacrylamide derivative, a polyacrylate, a polyacrylate derivative, a polymethacrylate, a polymethacrylate derivative, and any combination thereof. In one or more embodiments described in the preceding paragraph, the first friction reducing polymer includes at least one monomer selected from the group consisting of a 2-acrylamido-2-methylpropane sulfonic acid, an acrylamido tertiary butyl sulfonic acid, an acrylic acid, a salt of any of the foregoing, and any combination thereof. In one or more embodiments described in the preceding paragraph, the suspension agent is present in the composition in an amount from about 0.01 wt % to about 30 wt % by weight of the composition. In one or more embodiments described in the preceding paragraph, the salt includes at least one salt selected from the group consisting of a carbonate salt, a sulfate salt, a phosphate salt, a magnesium salt, a bromide salt, a formate salt, an acetate salt, a chloride salt, a fluoride salt, a bicarbonate salt, a nitrate salt, a phosphate salt, and any combination thereof.

An embodiment of the present disclosure is a method that includes: providing a water-based friction reducing additive that includes an aqueous base fluid, an ammonium sulfate salt, a first friction reducing polymer, and a second friction reducing polymer; introducing the water-based friction reducing additive into a treatment fluid; and introducing the treatment fluid into a wellbore penetrating at least a portion of a subterranean formation at a pressure sufficient to create or enhance one or more fractures within the subterranean formation.

In one or more embodiments described in the preceding paragraph, the first friction reducing polymer and the second friction reducing polymer include polyacrylamide and 2-acrylamido-2-methylpropane sulfonic acid. In one or more embodiments described in the preceding paragraph, the first friction reducing polymer is present in the water-based friction reducing additive in an amount from about 10 wt % to about 70 wt % by weight of the water-based friction reducing additive, and the second friction reducing polymer is present in the water-based friction reducing additive in an amount from about 0.01 wt % to about 10 wt % by weight of the water-based friction reducing additive. In one or more embodiments described in the preceding paragraph, the water-based friction reducing additive is present in the treatment fluid in an amount from about 0.1 gpt to about 100 gpt by volume of the treatment fluid.

To facilitate a better understanding of the present disclosure, the following examples of certain aspects of particular embodiments are given. The following examples are not the only examples that could be given according to the present disclosure and are not intended to limit the scope of the disclosure or claims.

EXAMPLES

Example 1

In this example, stability and friction reduction performance was tested for two water-based friction reducing additives. The first additive was prepared by dissolving 80 grams ("g") of ammonium sulfate salt in 158 g of deionized water in a blender, and then while blending, adding 70 g of a powdered friction reducing polymer. The second additive was prepared in the same manner as the first additive, with the addition of 2 g of a second friction reducing polymer of the present disclosure. The friction reducing polymers may be a polyacrylamide polymer that may include monomer units of 2-acrylamido-2-methylpropane sulfonic acid (AMPS). In order to test the suspension stability, the additives were poured into separate glass bottles and alternately transferred between a 70° C. water bath and a room temperature environment for about 2 weeks. After 2 weeks, the first additive contained a layer of clear fluid in the bottle that suggested syneresis, whereas the second additive could still flow when tilted in the bottle and contained no obvious precipitates or phase separation. This demonstrates that the addition of a second friction reducing polymer to the second additive may enhance the suspension stability of an additive of the present disclosure.

A flow test after mixing was also performed to compare the first additive with a solution including only the second friction reducing polymer. When 70 g of the powdered friction reducing polymer was added to the above ammonium sulfate solution (80 g of ammonium sulfate salt in 158 g of deionized water) and blended for 2 minutes, the solution readily flowed like a liquid or slurry when it was poured out. On the contrary, when 70 g of the second friction reducing polymer was added to a similar ammonium sulfate solution (80 g of ammonium sulfate salt in 158 g of deionized water) and blended, the solution gelled up in less than 2 minutes and did not flow when the blender was placed upside down. This shows that the addition of 2 g of a second friction reducing polymer to the first additive increased fluid viscosity and suspension.

Figure 3:
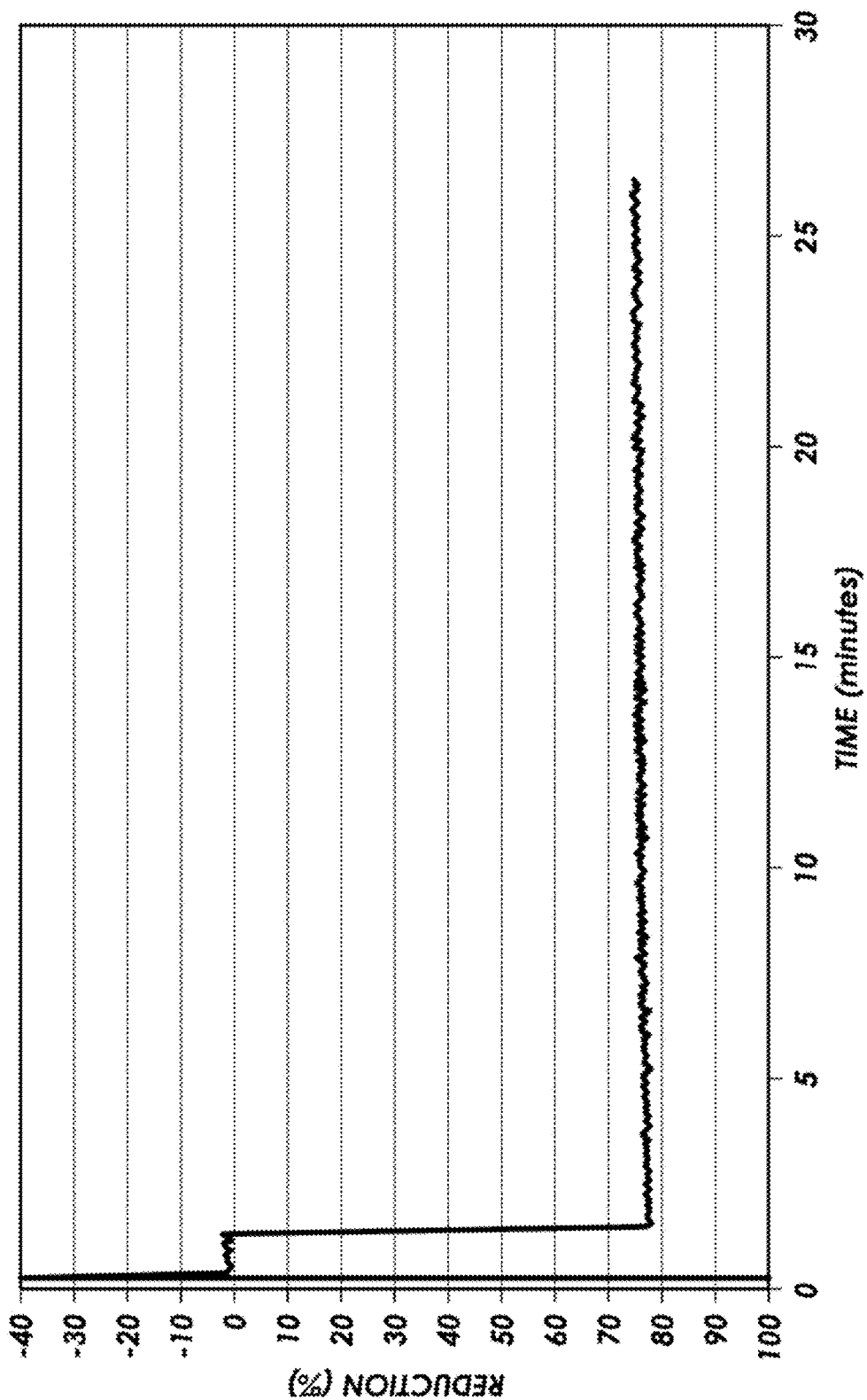
FIG. 3 is a graph illustrating the percentage of friction reduction for a composition in accordance with certain embodiments of the present disclosure.

In order to test the friction reduction performance of the second additive (including the second friction reducing polymer), a friction loop test was performed using a friction loop instrument consisting of a 0.5 inch-diameter smooth pipe test section. As shown in FIG. 3, the percentage of friction reduction of the second additive was measured in the friction loop for over 25 minutes. One minute after starting the test, 0.5 gpt of the second additive was added to 10 liters of tap water at a temperature of about 70 to 80° F., and this solution was circulated at a rate of 10 gallons per minute ("gpm") in the friction loop. As shown in FIG. 3, the second additive demonstrated an initial friction reduction of about 78% and subsequently maintained a friction reduction of over about 75% for the 25 minute trial. This demonstrates that a composition of the present disclosure, including a first friction reducing polymer and a suspension agent, undergoes fast hydration of the polymers and provides long-term suspension stability.

Figure 4:
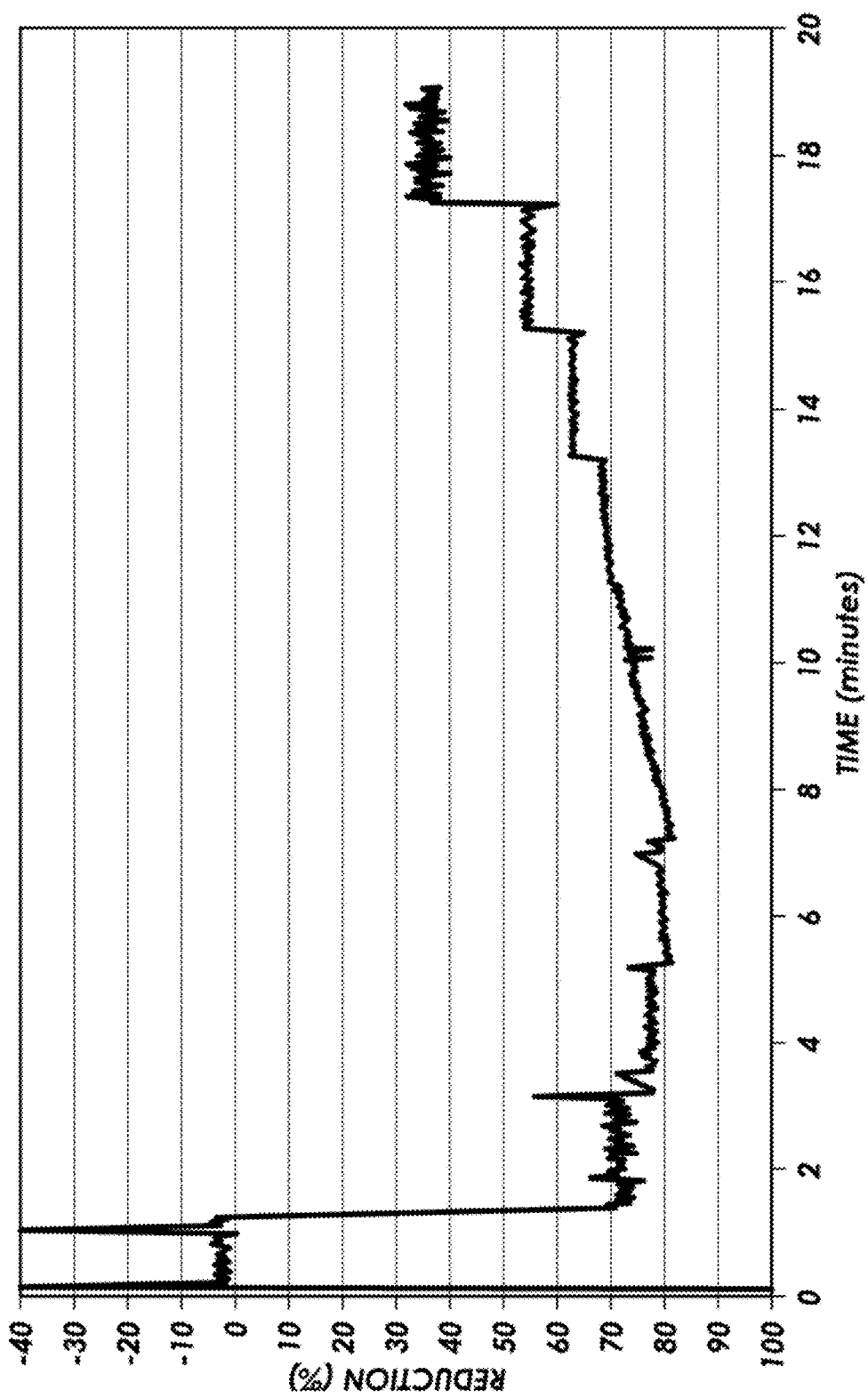
FIG. 4 is a graph illustrating the percentage of friction reduction for a composition undergoing a stress schedule in accordance with certain embodiments of the present disclosure.

Additionally, a friction loop test was performed on the second additive across a stress schedule of shears. One minute after starting the test, 0.5 gpt of the second additive was added to 10 liters of tap water at room temperature in the friction loop. The friction loop test was then run at the following sequence of flow rates (in gpm) in two minute intervals: 5, 10, 15, 20, 22, 20, 15, 10, and 5. As shown in FIG. 4, the second additive demonstrated an initial friction reduction of about 75% and a maximum friction reduction of over about 80% at the highest flow rates before decreasing to about 35% friction reduction at the end of the stress schedule. This demonstrates that a composition of the present disclosure including an aqueous base fluid, a salt, a first friction reducing polymer, and a suspension agent maintains friction reduction performance despite lengthy exposure to high shears.

Example 2

In this example, a third water-based friction reducing additive was prepared by dissolving about 70 g of ammonium sulfate salt with about 100 g of deionized water in a blender. While blending, 40 g of a powdered friction reducing polymer and 0.4 g of guar powder were added to the fluid sample. The powdered friction reducing polymer may be a polyacrylamide polymer that may include monomer units of 2-acrylamido-2-methylpropane sulfonic acid (AMPS). In order to test the suspension stability, the third additive was poured into a glass bottle and alternately transferred between a 70° C. water bath and a room temperature environment for about 2 weeks. After 2 weeks, the fluid sample could still flow when tilted in the bottle and contained no obvious precipitates or phase separation. This example demonstrates that the addition of a second polymer, such as guar powder, may enhance the suspension stability of an additive of the present disclosure.

Example 3

Figure 5:
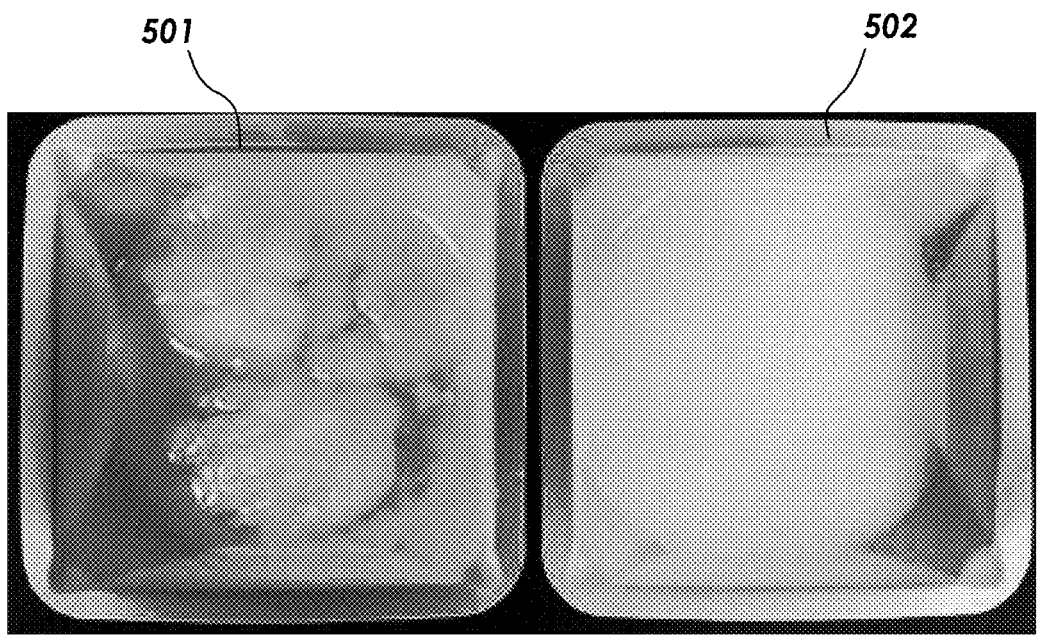
FIG. 5 is a photograph illustrating the stability of compositions with and without suspension agents in accordance with certain embodiments of the present disclosure.

In this example, fourth and fifth water-based friction reducing additives were tested for suspension stability. The fourth additive was prepared by dissolving 40 g of ammonium sulfate salt with 80 g of deionized water in a blender, and while blending, adding 30 g of a powdered friction reducing polymer. The fifth additive was prepared in the same manner as the fourth additive, with the addition of 1 g of a second friction reducing polymer of the present disclosure. The friction reducing polymers may be a polyacrylamide polymer that may include monomer units of 2-acrylamido-2-methylpropane sulfonic acid (AMPS). In order to test the suspension stability, the additives were poured into separate glass bottles and alternately transferred between a 70° C. water bath and a room temperature environment for about 2 weeks. As shown in FIG. 5, after 2 weeks, the fourth additive 501 showed significant syneresis and phase separation while the fifth additive 502 was homogenous with no obvious precipitates or phase separation. This demonstrates that the addition of a second friction reducing polymer to the fifth additive enhances the suspension stability of an additive of the present disclosure.

Example 4

Figure 6:
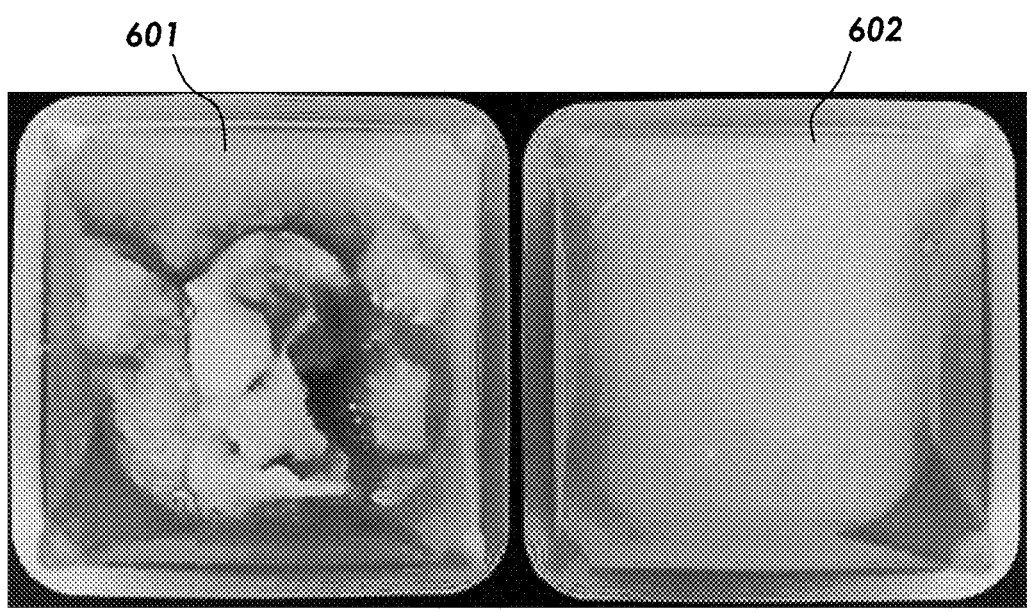
FIG. 6 is a photograph illustrating the stability of compositions with and without suspension agents in accordance with certain embodiments of the present disclosure.

In this example, sixth and seventh water-based friction reducing additives were tested for suspension stability. The sixth additive was prepared by dissolving 40 g of ammonium sulfate salt with 80 g of deionized water in a blender, and while blending, adding 30 g of a powdered friction reducing polymer. The seventh additive was prepared in the same manner as the sixth additive, with the addition of 0.5 g of a second friction reducing polymer of the present disclosure. The friction reducing polymers may be a polyacrylamide polymer that may include monomer units of 2-acrylamido-2-methylpropane sulfonic acid (AMPS). In order to test the suspension stability, the additives were poured into separate glass bottles and alternately transferred between a 70° C. water bath and a room temperature environment for about 2 weeks. As shown in FIG. 6, after 2 weeks, the sixth additive 601 showed significant syneresis and phase separation while the seventh additive 602 was homogenous with no obvious precipitates or phase separation. This demonstrates that the addition of a second friction reducing polymer to the seventh additive enhances the suspension stability of an additive of the present disclosure.

Example 5

In this example, eighth and ninth water-based friction reducing additives were tested for suspension stability. The eighth additive was prepared by mixing 40 g of ammonium sulfate salt with 80 g of deionized water in a blender, and while blending, adding 30 g of a powdered friction reducing polymer. The powdered friction reducing polymer may be a polyacrylamide polymer that may include monomer units of 2-acrylamido-2-methylpropane sulfonic acid (AMPS). The ninth additive was prepared in the same manner as the eighth additive, with the addition of 5 g of a hydrophilic clay of the present disclosure. In order to test the suspension stability, the additives were poured into separate glass bottles and alternately transferred between a 70° C. water bath and a room temperature environment for about 2 weeks. After 2 weeks, the eighth additive showed syneresis while the ninth additive more homogenous with no obvious precipitates or phase separation. This demonstrates that the addition of a hydrophilic clay to the ninth additive enhances the suspension stability of an additive of the present disclosure.

Example 6

In this example, four water-based friction reducing additives (tenth, eleventh, twelfth, and thirteenth water-based friction reducing additives) of the present disclosure were tested for suspension stability. The tenth additive was a saturated ammonium sulfate solution containing about 10-20 wt % of a powdered friction reducing polymer and about 0.6 wt % of a second friction reducing polymer. The friction reducing polymers may be a polyacrylamide polymer that may include monomer units of 2-acrylamido-2-methylpropane sulfonic acid (AMPS). Similar to the above examples, the addition of a second friction reducing polymer enhanced the suspension stability and the fluid viscosity of the additive.

The eleventh additive was a saturated ammonium sulfate solution containing about 15-20 wt % of a first friction reducing polymer, about 1 wt % of a second friction reducing polymer, and about 1.2 wt % of polydiallyldimethylammonium chloride (polyDADMAC). The twelfth additive was prepared in the same manner as the eleventh additive, except polyDADMAC was replaced with didecyldimethylammonium chloride (DDAC). The thirteenth additive was prepared in the same manner as the eleventh additive, except polyDADMAC was replaced with alkyl dimethyl benzyl ammonium chloride (ADBAC).

Figure 7:
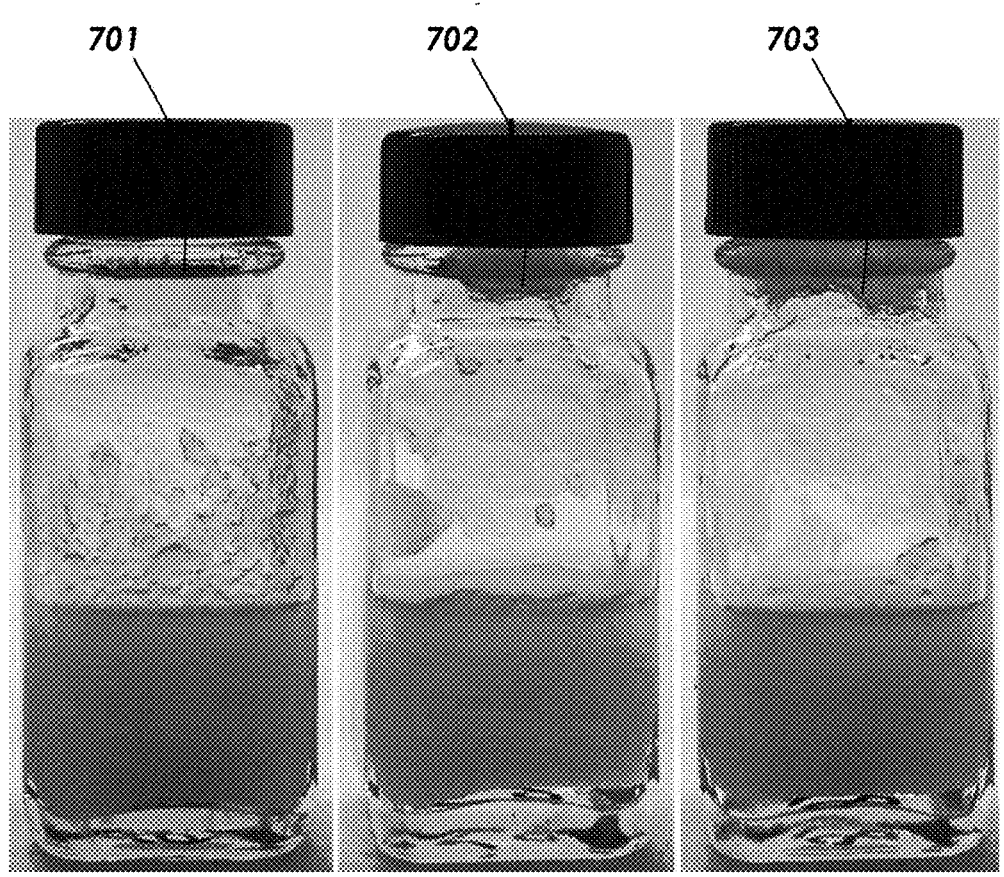
FIG. 7 is a photograph illustrating the stability of compositions with surfactants and suspension agents in accordance with certain embodiments of the present disclosure.

In order to test the suspension stability, the additives were poured into separate glass bottles and alternately transferred between a 70° C. water bath and a room temperature environment for about 4 weeks. As shown in FIG. 7, after 4 weeks, the eleventh additive 701, the twelfth additive 702, and the thirteenth additive 703 showed no obvious precipitates or phase separation. This demonstrates that additives of the present disclosure may maintain its suspension stability with the addition of surfactants, such as quaternary ammonium salts.

Example 7

Figure 8:
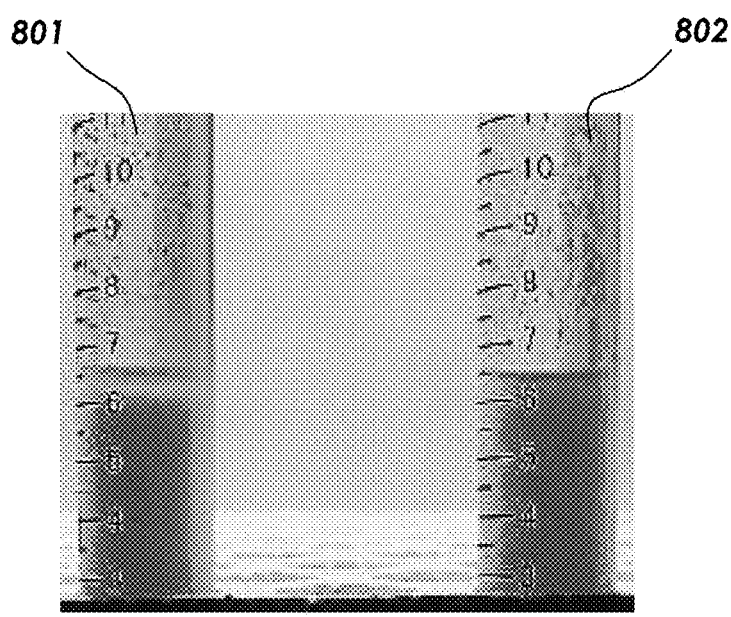
FIG. 8 is a photograph illustrating the stability of compositions with surfactants and suspension agents in accordance with certain embodiments of the present disclosure.

In this example, fourteenth and fifteenth water-based friction reducing additives were prepared for testing suspension stability. The fourteenth additive was a saturated ammonium sulfate solution containing about 12 wt % of a powdered friction reducing polymer and about 1.2 wt % of polyDADMAC. The fifteenth additive was prepared in the same manner as the fourteenth additive, with the additive containing an additional about 1.2 wt % of a second friction reducing polymer. The friction reducing polymers may be a polyacrylamide polymer that may include monomer units of 2-acrylamido-2-methylpropane sulfonic acid (AMPS). In order to test the suspension stability, the additives were poured into separate glass bottles and alternately transferred between a 70° C. water bath and a room temperature environment for about 1 day. As shown in FIG. 8, after 1 day, the fourteenth additive 801 showed minor phase separation while the fifteenth additive 802 was homogenous with no obvious precipitates or phase separation. This demonstrates that the addition of a second friction reducing polymer to the fifteenth additive enhances the suspension stability of an additive of the present disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   forming a water-based friction reducing additive that comprises:
      an aqueous base fluid,
      a salt,
      a first friction reducing polymer in an amount from about 10 wt % to about 70 wt % by weight of the additive, and
      a suspension agent comprising: a clay in an amount from about 0.1 wt % to about 30 wt % by weight of the additive or a second friction reducing polymer in an amount from about 0.01 wt % to 10 wt % by weight of the additive, wherein the second friction reducing polymer is selected from the group consisting of: polyacrylate, a polyacrylate derivative, a polyacrylate copolymer, a polymethacrylate, a polymethacrylate derivative, a polymethacrylate copolymer, a polyacrylamide, polyacrylamide derivative, a polyacrylamide copolymer, a acrylamide copolymer, guar, a guar derivative, a polysaccharide copolymer, a synthetic polymer, a superabsorbent polymer, and any combination thereof, wherein the water-based friction reducing additive does not comprise a surfactant;
   adding the formed water-based friction reducing additive into a treatment fluid comprising a base fluid; and
   introducing the treatment fluid into a wellbore penetrating at least a portion of a subterranean formation at a pressure sufficient to create or enhance one or more fractures within the subterranean formation.

2. The method of claim 1, wherein the first friction reducing polymer comprises at least one polymer selected from the group consisting of an acrylamide copolymer, an anionic acrylamide copolymer, a cationic acrylamide copolymer, a nonionic acrylamide copolymer, an amphoteric acrylamide copolymer, a polyacrylamide, a polyacrylamide derivative, a polyacrylate, a polyacrylate derivative, a polymethacrylate, a polymethacrylate derivative, and any combination thereof.

3. The method of claim 1, wherein the first friction reducing polymer comprises at least one monomer selected from the group consisting of a 2-acrylamido-2-methylpropane sulfonic acid, an acrylamido tertiary butyl sulfonic acid, an acrylic acid, a salt of any of the foregoing, and any combination thereof.

4. The method of claim 1, wherein the first friction reducing polymer comprises at least one polymer selected from the group consisting of a nonionic polymer, an anionic polymer, a cationic polymer, an amphoteric polymer, and any combination thereof.

5. The method of claim 1, wherein the formed water-based friction reducing additive is present in the treatment fluid in an amount from about 0.1 gpt to about 100 gpt by volume of the treatment fluid.

6. The method of claim 1, wherein the salt comprises at least one salt selected from the group consisting of a carbonate salt, a sulfate salt, a phosphate salt, a magnesium salt, a bromide salt, a formate salt, an acetate salt, a chloride salt, a fluoride salt, a bicarbonate salt, a nitrate salt, a phosphate salt, and any combination thereof.

7. A composition comprising:
   an aqueous base fluid;
   a salt;
   a first friction reducing polymer present in the composition in an amount from about 10 wt % to about 70 wt % by weight of the composition; and
   a second friction reducing polymer in an amount from about 0.01 wt % to 10 wt % by weight of the additive, wherein the second friction reducing polymer is selected from the group consisting of: polyacrylate, a polyacrylate derivative, a polyacrylate copolymer, a polymethacrylate, a polymethacrylate derivative, a polymethacrylate copolymer, a polyacrylamide, polyacrylamide derivative, a polyacrylamide copolymer, a acrylamide copolymer, guar, a guar derivative, a polysaccharide copolymer, a synthetic polymer, a superabsorbent polymer, and any combination thereof,
   wherein at least a portion of the first friction reducing polymer is suspended in the composition, and
   wherein the composition does not comprise a surfactant.

8. The composition of claim 7, wherein the first friction reducing polymer comprises at least one polymer selected from the group consisting of an acrylamide copolymer, an anionic acrylamide copolymer, a cationic acrylamide copolymer, a nonionic acrylamide copolymer, an amphoteric acrylamide copolymer, a polyacrylamide, a polyacrylamide derivative, a polyacrylate, a polyacrylate derivative, a polymethacrylate, a polymethacrylate derivative, and any combination thereof.

9. The composition of claim 7, wherein the first friction reducing polymer comprises at least one monomer selected from the group consisting of a 2-acrylamido-2-methylpropane sulfonic acid, an acrylamido tertiary butyl sulfonic acid, an acrylic acid, a salt of any of the foregoing, and any combination thereof.

10. The composition of claim 7, wherein the salt comprises at least one salt selected from the group consisting of a carbonate salt, a sulfate salt, a phosphate salt, a magnesium salt, a bromide salt, a formate salt, an acetate salt, a chloride salt, a fluoride salt, a bicarbonate salt, a nitrate salt, a phosphate salt, and any combination thereof.

11. A method comprising:
forming a water-based friction reducing additive that comprises:
an aqueous base fluid,
an ammonium sulfate salt,
a first friction reducing polymer in an amount from about 10 wt % to about 70 wt % by weight of the additive, and
a second friction reducing polymer in an amount from about 0.01 wt % to 10 wt % by weight of the additive, wherein the second friction reducing polymer is selected from the group consisting of: polyacrylate, a polyacrylate derivative, a polyacrylate copolymer, a polymethacrylate, a polymethacrylate derivative, a polymethacrylate copolymer, a polyacrylamide, polyacrylamide derivative, a polyacrylamide copolymer, a acrylamide copolymer, guar, a guar derivative, a polysaccharide copolymer, a synthetic polymer, a superabsorbent polymer, and any combination thereof, wherein at least a portion of the first friction reducing polymer is suspended in the formed water-based friction reducing additive, and wherein the water-based friction reducing additive does not comprise a surfactant;
adding the formed water-based friction reducing additive into a treatment fluid comprising a base fluid; and
introducing the treatment fluid into a wellbore penetrating at least a portion of a subterranean formation at a pressure sufficient to create or enhance one or more fractures within the subterranean formation.

12. The method of claim 11, wherein both the first friction reducing polymer and the second friction reducing polymer comprise polyacrylamide and 2-acrylamido-2-methylpropane sulfonic acid.

13. The method of claim 11, wherein the formed water-based friction reducing additive is present in the treatment fluid in an amount from about 0.1 gpt to about 100 gpt by volume of the treatment fluid.

* * * * *